H. B. PERSING.
PISTON RING.
APPLICATION FILED OCT. 30, 1920.
1,393,904.
Patented Oct. 18, 1921.
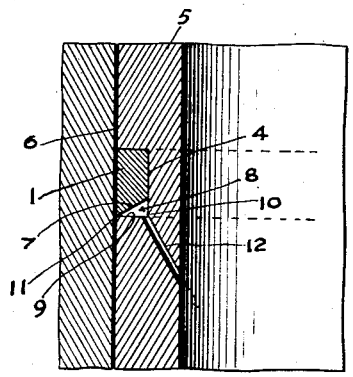
FIG. 1
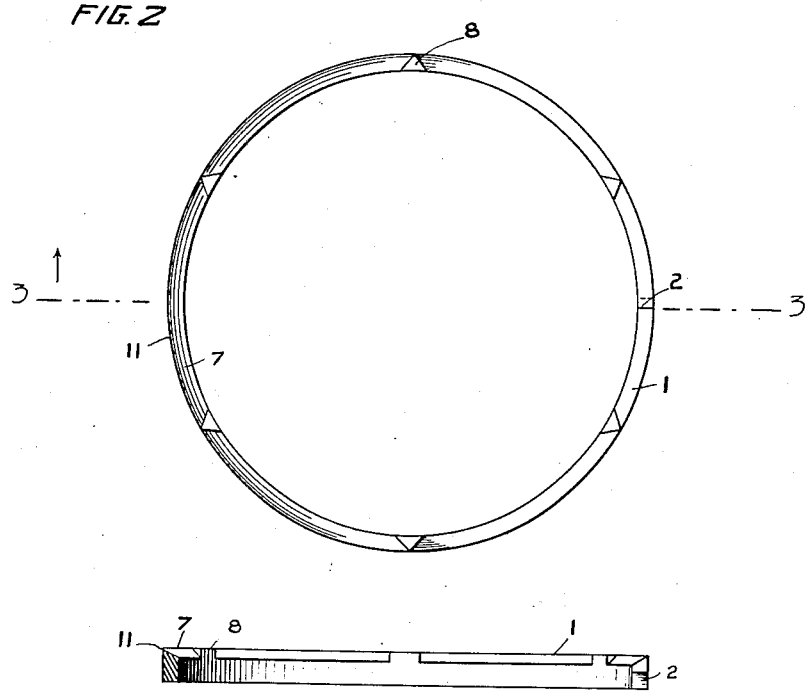
FIG. 2
FIG. 3
INVENTOR
H. B. PERSING
BY Wright & Chum
ATT'YS

UNITED STATES PATENT OFFICE.

HAZEL B. PERSING, OF SAN FRANCISCO, CALIFORNIA.

PISTON-RING.

1,393,904. Specification of Letters Patent. Patented Oct. 18, 1921.

Application filed October 30, 1920. Serial No. 420,611.

*To all whom it may concern:*

Be it known that I, HAZEL B. PERSING, a citizen of the United States, residing at 1536 Ellis street, San Francisco, in the county of San Francisco and State of California, have invented new and useful Improvements in Piston-Rings, of which the following is a specification.

This invention relates to improvements in piston rings of the type designed to prevent lubricating oil from passing up into the combustion chamber between the walls of the cylinders and pistons of an internal combustion engine.

The primary object of the invention is to provide a simply constructed and inexpensive piston ring which will positively prevent oil from getting up into the combustion chambers of the internal combustion engine and cause the oil collected in excessive amounts on the walls of the cylinders to be conducted back into the crank case through a passage leading through the walls of the piston from the piston ring groove to the interior of the piston.

Another object of the invention is to provide a ring of the character described which may be very quickly and easily constructed, the invention being such that the ordinary piston ring may be readily made to embody the features of this invention.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claim may be embodied in a plurality of forms.

Referring to the drawings:

Figure 1 is a fragmentary vertical sectional view of the wall of an internal combustion engine cylinder and piston showing a piston ring constructed in accordance with my invention and as it will appear when in use.

Fig. 2 is a bottom plan view of the ring.

Fig. 3 is a sectional view taken on the line 3—3 of Fig. 2.

In carrying out my invention, I provide an ordinary split piston ring 1 having the usual lap joint 2 and adapted to seat in the piston ring groove 4 of the piston 5 and to have a working engagement with the walls 6 of an engine cylinder. The ring 1 is provided upon its lower side with beveled portions 7 which, in this instance, as shown, extend entirely across the lower edge of the ring, said beveled portions 7 being inclined upwardly and inwardly. However, these portions may be otherwise formed as desired. Separating the beveled portions are triangularly shaped bearing portions 8 which are adapted to rest upon the lower wall 9 of the piston ring groove 4, the beveled portions 7 and bearings 8 separating said portion provided a series of segmental chambers 10 around the lower side of the ring. The ring may be beveled by use of a file or suitable grinding tool and it will thus be seen that the ordinary piston ring may be made to embody the features of my invention. By so beveling the ring upon its under face, there is provided a sharp scraping edge adapted to contact with the walls 6 of the engine cylinder, whereby oil will be forced under the edge 11 and into the chambers 10 and prevented from passing up into the combustion chambers of the engine. While the chambers 10 may be formed by grooving the under face of the ring, I prefer to bevel or cut away the under face so that the latter is inclined upwardly and inwardly as shown in the drawings. This beveling or cutting away can be accomplished much more cheaply and easily than otherwise cutting away the ring to provide the chambers.

To facilitate the return of the oil to the crank case, the piston 5 is provided with a series of downwardly and inwardly inclined passages 12, the upper ends of which open into the piston ring groove at the bottom wall thereof, whereas the lower ends communicate with the interior of the hollow piston. By having the bearing portions 8 triangular and the apexes of these portions disposed at the outer face of the ring, the scraping edge 8 is practically unbroken and the bearing surfaces of the portions 8 are sufficient to properly seat the ring in the groove therefor.

With reference to the foregoing description and the accompanying drawings, it will be seen that I have provided an excessively simple and inexpensive form of piston ring which will have maximum efficiency as a means for preventing the lubricating oil from passing up into the combustion chamber of an internal combustion engine, and it will also provide for the returning of the oil in extensive quantities collected upon the walls of the cylinders back into the crank case by reason of the chambers 10 on the under side of the ring and the passages 12.

I claim:

A piston ring having its lower edge beveled rearwardly and upwardly from the outer face of the ring to the inner face thereof, and bearing portions dividing the beveled portions into sections, which bearing portions are equal in thickness to the normal thickness of the ring, both vertically and horizontally, extend from the outer face to the inner face of the ring and are tapered on opposite sides to a point toward the outer face of the ring.

HAZEL B. PERSING.